(12) United States Patent
Alberti et al.

(10) Patent No.: US 7,693,759 B2
(45) Date of Patent: Apr. 6, 2010

(54) ON DEMAND ACCRUAL SYSTEM AND METHOD

(75) Inventors: Emilio Angelo Alberti, Oxford, CT (US); Norman Welton Garnett, Mount Vernon, NY (US); Manuel Elpidio Rodriguez, Waterbury, CT (US)

(73) Assignee: International Business Machines Corporation, Armonk, NY (US)

( * ) Notice: Subject to any disclaimer, the term of this patent is extended or adjusted under 35 U.S.C. 154(b) by 1829 days.

(21) Appl. No.: 10/771,034

(22) Filed: Feb. 3, 2004

(65) Prior Publication Data
US 2005/0171873 A1 Aug. 4, 2005

(51) Int. Cl.
*G07F 19/00* (2006.01)
(52) U.S. Cl. .......................................... 705/30; 705/33
(58) Field of Classification Search ................ 705/30
See application file for complete search history.

(56) References Cited

U.S. PATENT DOCUMENTS

| | | | |
|---|---|---|---|
| 5,875,435 A | 2/1999 | Brown | |
| 6,073,104 A | 6/2000 | Field | |
| 6,360,211 B1 * | 3/2002 | Anderson et al. | 705/40 |
| 6,513,019 B2 | 1/2003 | Lewis | |
| 7,003,494 B2 * | 2/2006 | Beach et al. | 705/40 |
| 7,117,172 B1 * | 10/2006 | Black | 705/35 |
| 2002/0019759 A1 | 2/2002 | Arunapuram et al. | |
| 2002/0032625 A1 | 3/2002 | Brown | |
| 2002/0046058 A1 | 4/2002 | Brown | |
| 2002/0082991 A1 * | 6/2002 | Friedman et al. | 705/40 |
| 2002/0133460 A1 | 9/2002 | Field | |
| 2003/0050819 A1 | 3/2003 | Koenigbauer et al. | |
| 2003/0204458 A1 * | 10/2003 | Carroll et al. | 705/35 |
| 2004/0059651 A1 * | 3/2004 | MaGuire et al. | 705/30 |
| 2005/0071228 A1 * | 3/2005 | Bortolin et al. | 705/14 |

OTHER PUBLICATIONS

Miller, Jr., R.C., "Introduction to the IBM 3800 Printing Subsystem Models 3 and 8," IBM Journal of Res. & Dev., vol. 28, No. 3, May 1984, 6 pgs.

* cited by examiner

*Primary Examiner*—Ramsey Refai
(74) *Attorney, Agent, or Firm*—Douglas Lashmit; Hoffman Warnick LLC

(57) ABSTRACT

A system and method for posting tracking accrued revenue and costs. The system includes an accrual system that causes each inputted accrual event to be posted at the same time (e.g., on the same day) that the accrual event was received; and a reversal system that, on demand (e.g., daily), checks a set of reversal rules and reverses any accrual events that triggered a reversal rule.

13 Claims, 4 Drawing Sheets

| Event | Results with traditional accrual | Results with On Demand Net Accrual |
|---|---|---|
| May 15: A customer order is created with qty. of 100 | NA | NA |
| May 22: 20 items out of the 100 are partially delivered to customer | Accrue revenue and cost is NOT recognized | Accrue revenue and cost for the 20 items is recognized |
| May 28: 30 additional items are subsequently partially delivered to customer | Accrue revenue and cost is NOT recognized | Additional accrue revenue and cost for the 30 items is recognized |
| May 30: Last day of the accounting period | Accrue revenue and cost is recognized for 50 items | No additional accrue revenue and cost is generated because accrue revenue and cost have been recognized at the day of shipment |
| June 01: First day of the next accounting period | Accrue revenue and cost is reversed for 50 items | NA |
| June 02: A billing block is added to the order because of a quality concern from the customer | NA | NA |
| June 05: 50 additional items are subsequently partially delivered to customer | Accrue revenue and cost is NOT recognized | Additional accrue revenue and cost for the 50 items is recognized |
| June 15: The quality issue is solved, the billing block is removed and customer has been billed | Only the real revenue and cost is recognized through billing | All accrue revenue and cost is reversed due to customer bill and real revenue and cost is recognized through billing |
| June 30: Last day of the accounting period | NA | NA |

FIG. 2

ON DEMAND ACCRUAL SYSTEM AND METHOD

BACKGROUND OF THE INVENTION

1. Technical Field

The present invention relates generally to accounting systems, and more specifically relates to a system and method for performing on demand accrual in an enterprise resource planning (ERP) system.

2. Related Art

Enterprise resource planning (ERP) systems, such as that sold by SAP™, allow many different facets of a business to be managed and integrated together with a comprehensive computing solution. Thus, ERP systems allow information to be processed and shared by and among different parts of the business, including product planning, parts purchasing, maintaining inventories, interacting with suppliers, providing customer service, tracking orders, accounting, finance, etc.

As businesses become more complex and competitive, the ability to provide "on-demand" information, i.e., a current snapshot of a business metric, remains an important challenge. One area where this challenge exists involves providing a daily gross profit analysis from an ERP system. In order to determine gross profit, revenue and cost data must be extracted for the ERP system. However, for any given accounting period, a significant portion of the revenue and cost must be "accrued." Accrued revenue and cost is that portion of the total revenue and cost that cannot be recognized from an accounting perspective as "real revenue" or "real cost" because, e.g., the customer has not yet been billed.

Reasons for accruing revenue and cost generally fall into, but are not limited to, three categories: (1) Partial Deliveries: ordered items that have been partially delivered but remain unbilled; (2) Shipped But Unbilled Activities (SBU): ordered items that have been shipped, but not yet billed; and (3) Billed Not Accounted Activities: ordered items that have been billed to the client, but not yet posted to accounting due to some application error.

Standard accounting practices require accrued revenue and cost to be posted on the last day of the month and reversed at the first day of the following month when the new period is opened. This methodology allows the real revenue to be posted when the customer is billed. Unfortunately, this existing methodology does not allow a daily gross profit analysis to be generated. Accordingly, a need exists for a system and method that will allow on demand accrual calculations.

SUMMARY OF THE INVENTION

The present invention addresses the above-mentioned problems, as well as others, by providing an accrual system and method in which accruals are generated on a daily basis for those activity that are not already accrued, and which are reversed only when the customer has been billed and the "real revenue" can be posted, or when an item remains in accrual status for more than 30 days. Thus, while standard accounting methodologies perform a mass accrual/reversal at the end/beginning of each month, the daily net accrual process described herein accounts daily for activities that have not already been accrued, and reverses daily only those items previously accrued, which are eligible for reversal.

In a first aspect, the invention provides an on demand net accrual system for tracking accrued revenue and costs, comprising: an accrual system that causes each inputted accrual event to be posted at the same time that the accrual event was received; and a reversal system that, on demand, checks a set of reversal rules and reverses any accrual events that triggered a reversal rule.

In a second aspect, the invention provides a method for tracking accrued revenue and costs, comprising: receiving accrual events; posting each received accrual event at the same time that the accrual event was received; checking a set of reversal rules on demand; and reversing any accrual events that triggered a reversal rule.

In a third aspect, the invention provides a program product stored on a recordable medium for tracking accrued revenue and costs, comprising: means for receiving accrual events; means for posting each received accrual event at the same time that the accrual event was received; means for checking a set of reversal rules on demand; and means for reversing any accrual events that triggered a reversal rule.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an exemplary business scenario showing the operation of the present invention relative to the prior art.

DETAILED DESCRIPTION OF THE INVENTION

Figure 1:
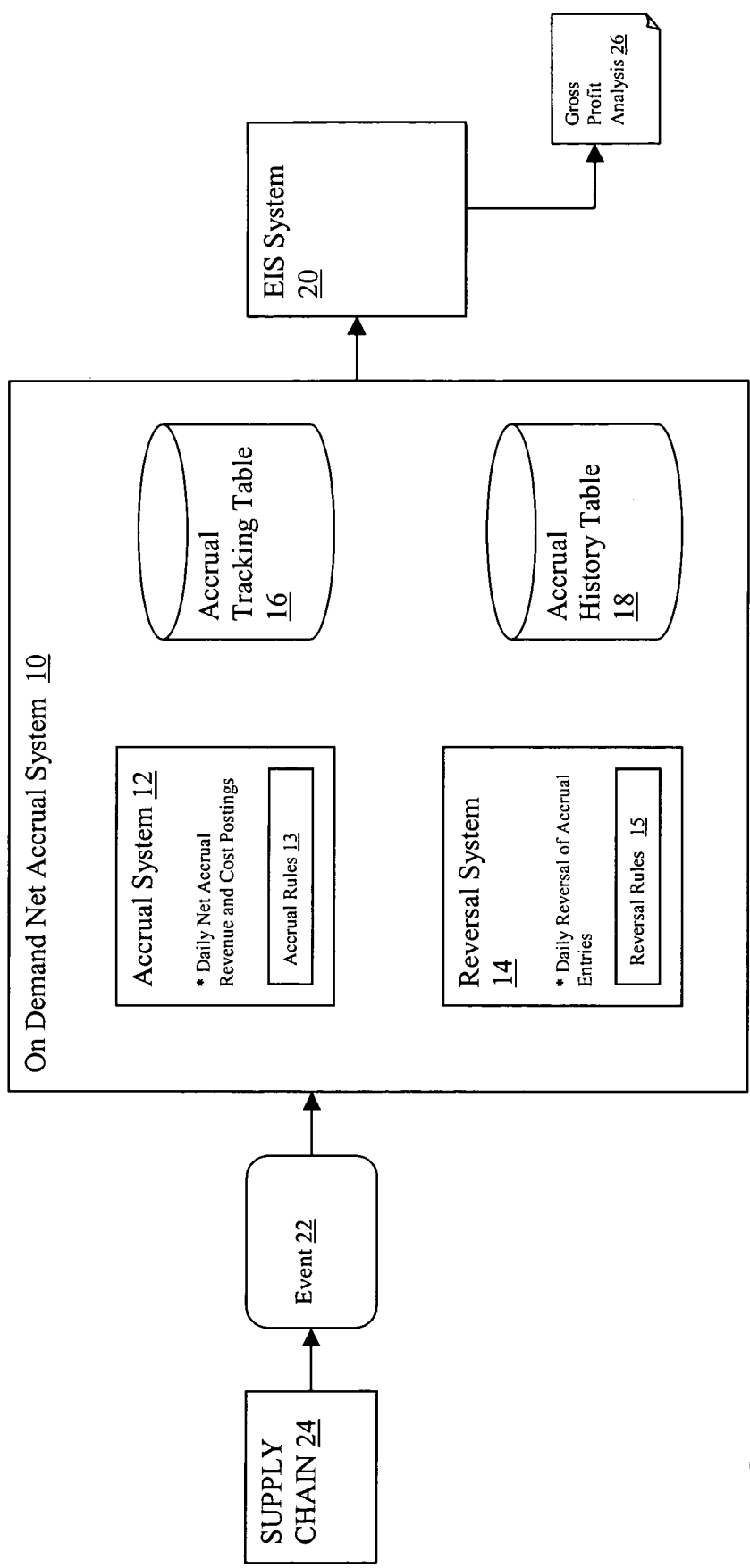
FIG. 1 depicts an on demand net accrual system in accordance with the present invention.

Referring now to the drawings, FIG. 1 depicts an on demand net accrual system 10 that analyzes events 22 obtained, e.g., from a supply chain 24. System 10 includes an accrual system 12 capable of posting accruals at the same time they are received based on a set of accrual rules 13, and a reversal system 14 capable of performing reversals at any time (i.e., "on demand") based on a set of reversal rules 15. In the exemplary embodiments described herein, accrual events are posted via a batch process on the same day they are received and reversal system 14 is run daily to check for and perform reversals. However, it should be noted that accruals could be posted immediately, or within some predefined window of time after they are received. Similarly, reversals could take place at any time interval (e.g., daily, weekly, as desired, etc.).

As noted above, in prior art accounting systems, accrual and reversal events were posted on the last day of the month and first day of the following month, respectively. However, in reality, accrual and reversal events occur on a regular basis. Accordingly, system 10 provides a system for tracking accrual and reversal events on a daily basis, thereby allowing executive information (EIS) system 20 to provide a daily gross profit analysis 26. Daily gross profit analysis 26 may be defined as the breakdown of Revenue less Cost of Goods Sold for the units shipped that day. Typical profitability analysis breakdowns include: product family, sales geographical area, manufacturing, geographical area, etc.

Accrual system 12 utilizes accrual rules 13 to identify accrual scenarios from the inputted events 22. Accrual events include, but are not limited to, e.g., (1) Partial Deliveries: ordered items that have been partially delivered but remain unbilled; (2) Shipped But Unbilled Activities (SBU): ordered items that have been shipped, but not yet billed; and (3) Billed Not Accounted (BNA) Activities: ordered items that have been billed to the client, but not yet posted to accounting due to some application error. When an accrual event occurs, accrual system 12 checks to see if the event has been previously accrued. If it has not been previously accrued, then accrual system 12 posts the accrual on that day. Accrual rules 13 may be modified as needed to define other possible accrual scenarios, e.g., concessions, service packs, try and buy, etc.

The accrual system 12 may generate accounting documents (e.g., Partial Delivery accrual, Shipped But Unbilled accrual, or Billed Not Accounted accrual) that post revenue, unbilled A/R, cost (where applicable) and field inventory (where applicable, field inventory typically represents a cost clearing account). To implement the concept of daily net accrual, accrual tracking table 16 may be implemented and be updated from accrual system 12 with relevant information of the accrual documents that has been created. Accrual tracking table may be implemented as any type of storage capable of holding data, e.g., a physical database, a data object, a data structure, RAM, etc.

The accrual tracking table 16 can store the following data for documents accrued and still not reversed (K for key fields):

Client ID (K)
Sales organization (K)
Document number (K): used to store the delivery document number for SBU and partial deliveries accrual cases or the billing document number for billed not accounted accrual cases
Document item (K): used to store the delivery item number for SBU and partial deliveries accrual cases
Accounting document number (K): accrual accounting document number
Document category: used to identify the type of document, billing document or delivery document, which is stored in the "document number" field
Partially delivered indicator: used to distinguish partially deliveries accruals from SBU
Posting date: posting date of the accrual accounting document (shipping date for partial delivery and SBU, billing date for BNA)
Reference Quantity: picking quantity for partial delivery, or shipped quantity for SBU at the time of accrual
Base Unit: Unit of measure of the quantity field
Cost amount: cost amount for partial delivery, SBU and BNA at the time of accrual
Cost currency: currency key of cost amount Before creating an accounting document, the accrual system 12 will check the accrual tracking table 16. For partial delivery and SBU events, accrual tracking table 16 will be used to prevent creating accrual accounting documents for the same combination of item and quantity. For a BNA event, accrual tracking table 16 will be used to prevent creating an accrual accounting document for the same billing document number.

An accrual history table 18 may be utilized to contain the reversed accrual records from the accrual tracking table 16 (all fields) with the reversed accounting document and its posting date. Like the accrual tracking table 16, the accrual history table 18 may be implemented as any type of storage capable of holding data, e.g., a physical database, a data object, a data structure, RAM, etc. In the case of partial deliveries and shipped but unbilled events, the use of this table in the accrual system 12 will prevent an accrual for the quantity of the delivery item that has already been accrued based on the 30 days rule.

The accrual history table 18 can also be used for reporting purposes, technical research and auditing of accrual situations. The accrual history can also be purged on demand. The fields defined in the accrual history table 18 are the same of the accrual tracking table 16, with the addition of Reversal Document number, Posting date and repost indicator.

Client ID (K)
Sales organization (K)
Document number (K): used to store the delivery document number for SBU and partial deliveries accrual cases or the billing document number for billed not accounted accrual cases
Document item (K): used to store the delivery item number for SBU and partial deliveries accrual cases
Accounting document number (K): accrual accounting document number
Document category: used to identify the type of document, billing document or delivery document, which is stored in the "document number" field
Partially delivered indicator: used to distinguish partially deliveries accruals from SBU
Accrual accounting document number
Posting date: posting date of the accrual accounting document (shipping date for partial delivery and SBU, billing date for BNA)
Reference Quantity: picking quantity for partial delivery, shipped quantity for SBU, billed quantity for SBU at the time of accrual
Base Unit: Unit of measure of the quantity field
Cost amount: cost amount for partial delivery, SBU and BNA at the time of accrual
Cost currency: currency key of cost amount
Reversal accounting document
Reversal posting date
Repost indicator: used to indicate whether the delivery item is re-accrued for partial delivery and SBU
30 days rule reversal indicator: used to indicate whether the accrual for delivery item has been reversed based on 30 day rule. It is used by accrual posting program to prevent re-accrual of the quantity in the delivery item.

Reversal system 14 utilizes reversal rules 15 to identify reversal scenarios from the inputted events 22. Reversal scenarios include the following:

(1) 30 day rule—Reverse if the accrual has lapsed at least 30 days (accrual posting date+30 days) or the accrual still exists at end of the following posting period.

(2) Partial Delivery—Reverse if the delivery has been completely invoiced or deleted; or if the delivery item has been invoiced or deleted.

(3) Shipped but Unbilled (SBU)—Reverse if the delivery has been completely invoiced or deleted; or if the delivery item has been invoiced or deleted. Note that for SBUs, the Accrual Tracking Table is identified with a blank partially delivered indicator.

(4) Billed not Accounted (BNA)—Reverse if an accounting document has been generated or the billing document has been canceled.

In addition, when an accrual document has been reversed, the corresponding entry in the accrual tracking table 16 that was inserted from the accrual system 12 at the time of accrual, will be deleted. The entries deleted from the accrual tracking table 16 will be saved in the accrual history table 18, together with the reversal accounting document number and the posting date.

The reversal system 14 can be run daily after a batch billing run (i.e., a process or program that bills all the transactions which are due to be billed at a given point in time) and before the daily accrual system 12. This will enable the reversal of accrual accounting documents containing items that have been billed; items that have been accrued for a certain reason, and have been changed to the BNA status; or items that have been accrued together within the same accrual accounting document, and one of the items has been billed, and the other items needs to be re-accrued or reposted.

Referring now to FIG. 2, a table depicting a scenario of business events is shown that describes the operational differences between the on demand net accrual system 10 and the prior art methodology. The first column lists the inputted event 22, the second column lists the action or results using traditional accrual approach, and the third column lists the action or results using the on demand net accrual system described above.

On May 15 a customer orders a quantity of 100 items, which does not result in any action taken under either approach. On May 22, a partial delivery of 20 items of the ordered items is made, which does not result in any action under traditional accrual, but under the present approach results in recognizing accrue revenue and cost for the 20 shipped items. Next, on May 28, an additional 30 of the ordered items are shipped with the same effect as the May 22 shipment.

On May 30, the last day of the month, accrue revenue and cost is recognized for the 50 shipped items under the traditional approach, but nothing is recognized under the current approach. Similarly, on June 1, accrue revenue and cost for the 50 shipped items are reversed under the traditional approach, but nothing is reversed under the current approach.

On June 2, a billing block is added to the order. No action is taken under either approach. On June 5, the final 50 items are shipped, which does not result in any action under traditional accrual, but under system 10 results in recognizing accrue revenue and cost for the 50 shipped items.

On June 15, the billing block is removed and the customer is billed. Under the traditional approach, only the real revenue and cost is recognized. However, under the new approach, the accrue revenue and cost for all 100 items is reversed, and the real cost and revenue is recognized through billing. On the last day of the month, June 30, neither approach takes any action.

Figure 3:
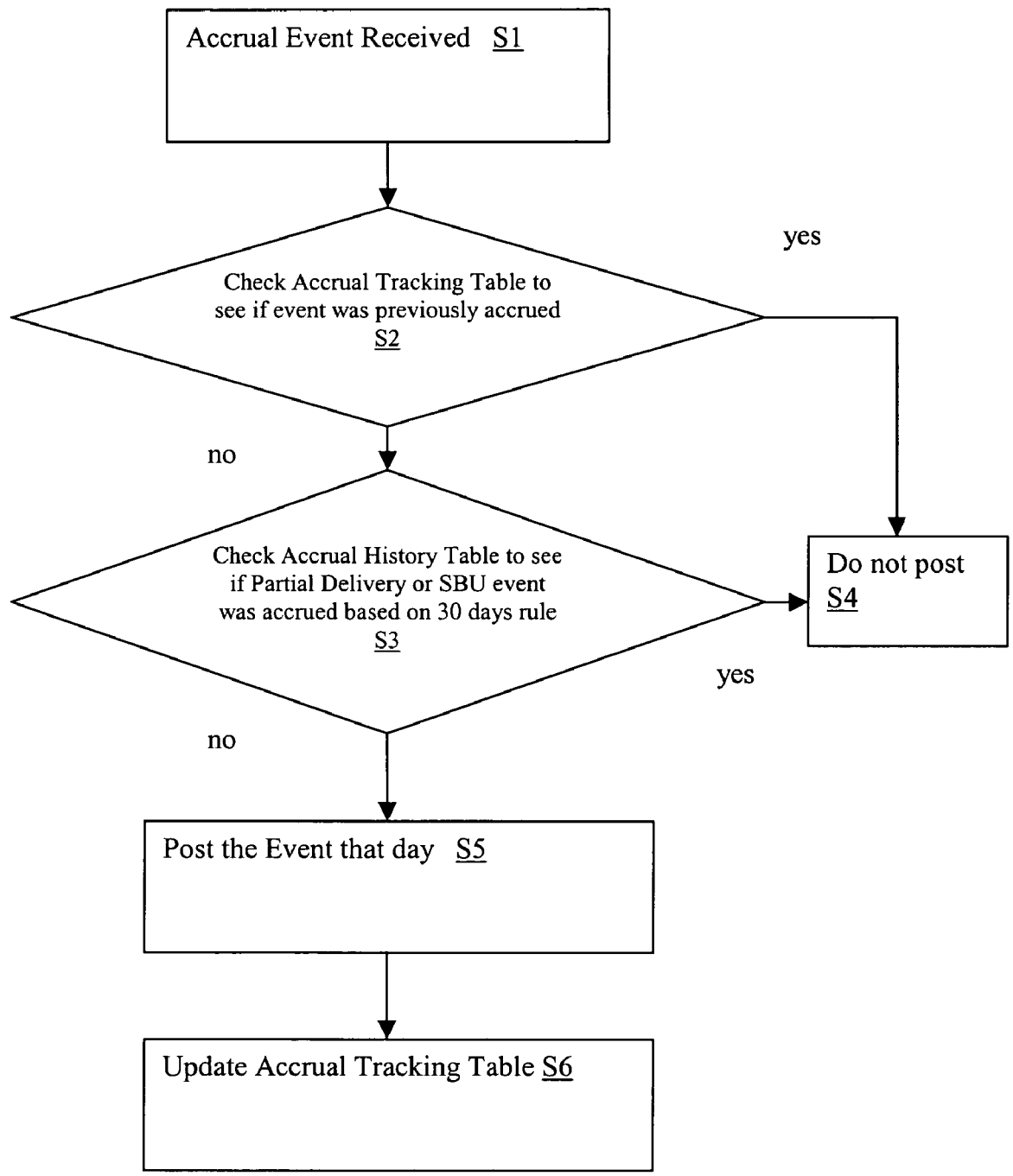
FIG. 3 depicts a flow chart depicting operation of the accrual process in accordance with the present invention.

Referring now to FIG. 3, a flow chart depicting operation of accrual system 12 is shown. In step S1, an accrual event is received. At step S2, the accrual tracking table 16 is checked to see if the event was previously posted. At step S3, accrual system 12 checks the accrual history table 18 to see if either a partial delivery or SBU event was previously accrued based on the 30 days rule. If the event was previously accrued, then the event is not posted, see step S4. Otherwise, the event is posted on the same day (e.g., via a batch operation) at step S5 and the accrual tracking table 16 is updated with the event/accrual information.

Figure 4:
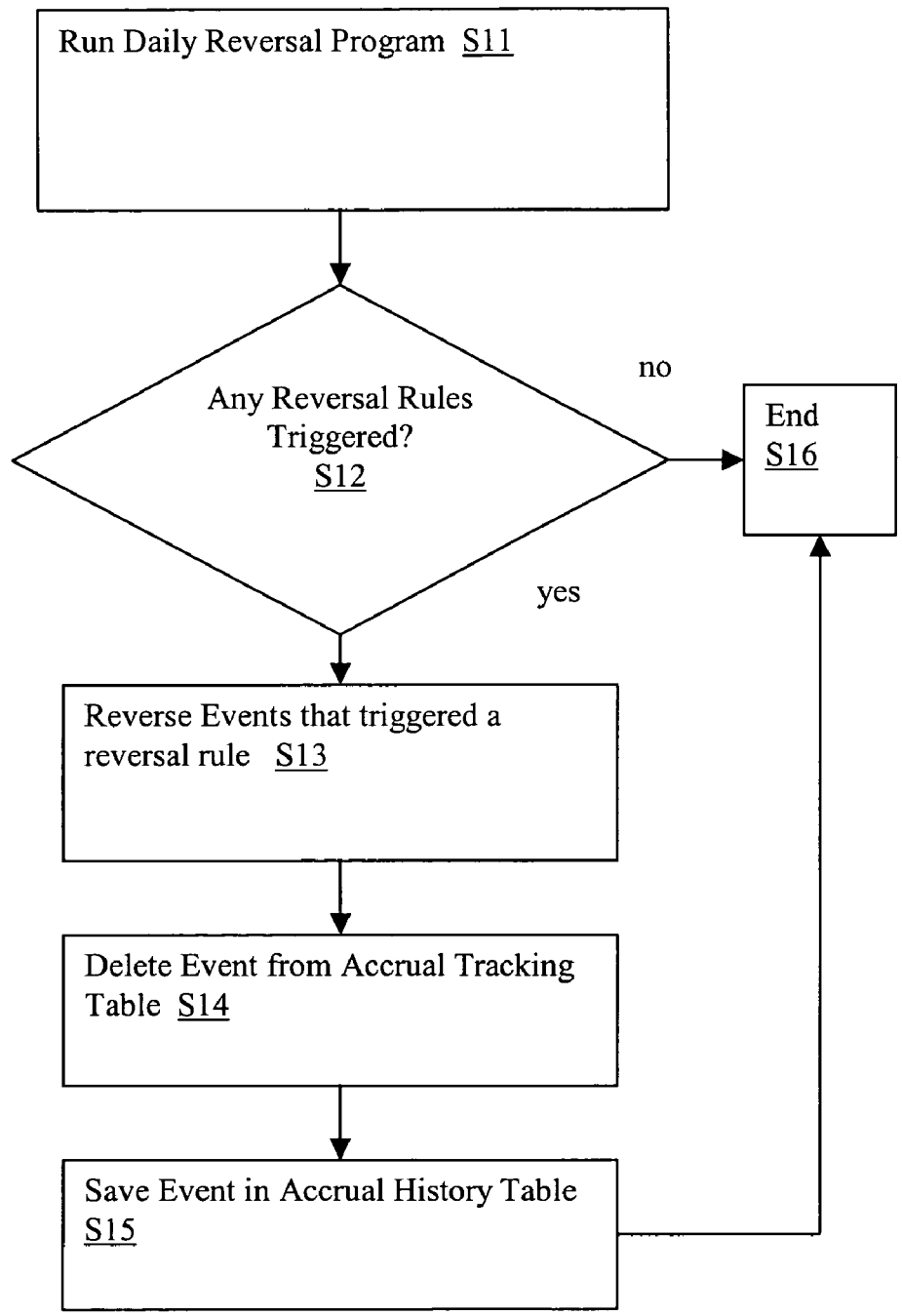
FIG. 4 depicts a flow chart depicting operation of the reversal process in accordance with the present invention.

Referring now to FIG. 4, a flow chart depicting operation of reversal system 14 is shown. Each day, reversal system 14 is run, e.g., via a batch operation, at step S11. Reversal system 14 checks to see if any of the reversal rules 15 (described above) have been triggered at step S12. If no rules 15 were triggered, the process ends. Otherwise, at step S13, all the events that triggered a reversal rule are reversed. Next, at steps S14 and S15, the reversed events are deleted from the accrual tracking table 16, and are added to the accrual history table 18.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. An on demand net accrual system for tracking accrued revenue and costs, comprising:
    a computer including an accrual system that causes each accrual event to be posted at the same time that the accrual event was received wherein an accrual event includes: ordered items that have been partially delivered but remain unbilled; ordered items that have been shipped, but not yet billed; and ordered items that have been billed to a client, but not yet posted,
    a reversal system that, on demand, checks a set of reversal rules and reverses each accrual event that triggered a reversal rule and,
    an accrual tracking table for storing accrual events, wherein the reversal system causes accrual events to be removed from the accrual tracking table and added to an accrual history table when the accrual event is reversed.

2. The on demand net accrual system of claim 1, wherein the accrual system includes a mechanism for checking each accrual event to ensure that the accrual event was not previously posted.

3. The on demand net accrual system of claim 1, wherein the reversal rules include a 30 days rule, a partial delivery rule, a billed but not shipped rule, and a billed but not accounted rule.

4. The on demand net accrual system of claim 1, wherein said computer is integrated into an enterprise resource planning system.

5. The on demand net accrual system of claim 1, wherein each inputted accrual event is posted on the same day that the accrual event was received and the reversal system checks the set of reversal rules on a daily basis to reverse any accrual events that triggered a reversal rule.

6. A method for tracking accrued revenue and costs, comprising:
    receiving, by a computer, accrual events wherein an accrual event includes ordered items that have been partially delivered but remain unbilled; ordered items that have been shipped, but not yet billed; and ordered items that have been billed to a client, but not yet posted;

posting, by the computer, each received accrual event at the same time that the accrual event was received; checking a set of reversal rules on demand; reversing any accrual events that triggered any of the set of reversal rules, generating, by the computer, a daily gross profit analysis, storing, by the computer, each accrual event in an accrual tracking table and removing, by the computer, accrual events from the accrual tracking table and adding the event, by the computer, to an accrual history table when the accrual event is reversed.

7. The method of claim 6, including the further step of checking each accrual event to ensure that the accrual event was not previously posted.

8. The method of claim 6, wherein the reversal rules include a 30 days rule, a partial delivery rule, a billed but not shipped rule, and a billed but not accounted rule.

9. The method of claim 6, wherein each received accrual event is posted on the same day that the accrual event was received and the set of reversal rules are checked on a daily basis.

10. A program product stored on a recordable medium for tracking accrued revenue and costs, comprising:

means for receiving accrual events wherein an accrual event includes ordered items that have been partially delivered but remain unbilled; ordered items that have been shipped, but not yet billed; and ordered items that have been billed to a client, but not yet posted;

means for posting each received accrual event at the same time that the accrual event was received;

means for checking a set of reversal rules on demand;

means for reversing any accrual events that triggered any of the set of reversal rules, means for generating a daily gross profit analysis, means for storing each accrual event in an accrual tracking table; and means for removing accrual events from the accrual tracking table and adding the event to an accrual history table when the accrual event is reversed.

11. The program product of claim 10, further including means for checking each accrual event to ensure that the accrual event was not previously posted.

12. The program product of claim 10, wherein the reversal rules include a 30 days rule, a partial delivery rule, a billed but not shipped rule, and a billed but not accounted rule.

13. The program product of claim 10, wherein each received accrual event is posted on the same day that the accrual event was received and the set of reversal rules are checked on a daily basis.

* * * * *